United States Patent
Narasimharao et al.

(10) Patent No.: US 10,316,681 B2
(45) Date of Patent: Jun. 11, 2019

(54) SYSTEM AND METHOD FOR DOMESTIC BLEED CIRCUIT SEALS WITHIN A TURBINE

(71) Applicant: General Electric Company, Schenectady, NY (US)

(72) Inventors: Jagata Laxmi Narasimharao, Karnataka (IN); Thomas Ory Moniz, Loveland, OH (US); Mohamed Musthafa Thoppil, Karnataka (IN); Bhaskar Nanda Mondal, Karnataka (IN); Atanu Saha, Karnataka (IN)

(73) Assignee: General Electric Company, Schenectady, NY (US)

( * ) Notice: Subject to any disclaimer, the term of this patent is extended or adjusted under 35 U.S.C. 154(b) by 411 days.

(21) Appl. No.: 15/168,581

(22) Filed: May 31, 2016

(65) Prior Publication Data
US 2017/0342851 A1 Nov. 30, 2017

(51) Int. Cl.
| | |
|---|---|
| F01D 11/02 | (2006.01) |
| F01D 11/04 | (2006.01) |
| F01D 5/12 | (2006.01) |
| F01D 25/12 | (2006.01) |
| F01D 5/08 | (2006.01) |

(Continued)

(52) U.S. Cl.
CPC .............. *F01D 11/04* (2013.01); *F01D 5/082* (2013.01); *F01D 5/085* (2013.01); *F01D 5/12* (2013.01); *F01D 11/02* (2013.01); *F01D 25/12* (2013.01); *F01D 3/00* (2013.01); *F01D 11/001* (2013.01); *F02C 7/28* (2013.01); *F05D 2220/32* (2013.01);

(Continued)

(58) Field of Classification Search
CPC ....... F01D 5/082; F01D 11/02; F05D 2240/55
See application file for complete search history.

(56) References Cited

U.S. PATENT DOCUMENTS

| | | | |
|---|---|---|---|
| 2,966,296 A | | 12/1960 | Morley et al. |
| 3,647,313 A | * | 3/1972 | Koff ........................ F01D 5/084 415/115 |

(Continued)

FOREIGN PATENT DOCUMENTS

| | | |
|---|---|---|
| EP | 2211016 A2 | 7/2010 |

OTHER PUBLICATIONS

International Search Report and Written Opinion issued in connection with corresponding PCT Application No. PCT/US2017/028519 dated Jun. 30, 2017.

*Primary Examiner* — Ninh H. Nguyen
(74) *Attorney, Agent, or Firm* — Dority & Manning, P.A.

(57) ABSTRACT

A turbine assembly includes a rotor assembly including a shaft coupled to a plurality of rotor stages including a plurality of turbine blades. The shaft and the plurality of turbine blades define a wheelspace therein. The turbine assembly further includes a plurality of seals in series, at least one seal of the plurality of seals is coupled between a static support member and a respective rotor stage such that a plurality of turbine cavities in series are defined within the wheelspace. Each turbine cavity of the plurality of turbine cavities defined by the plurality of seals receives a pressurized fluid flow that applies an axially aft force to the respective rotor stage of the plurality of rotor stages that at least partially reduces net rotor thrust generated by the rotor assembly during operation, the pressurized fluid flow further provides turbine purge within the wheel space.

17 Claims, 3 Drawing Sheets

(51) Int. Cl.
*F01D 3/00* (2006.01)
*F01D 11/00* (2006.01)
*F02C 7/28* (2006.01)

(52) U.S. Cl.
CPC ...... *F05D 2230/60* (2013.01); *F05D 2240/55* (2013.01)

(56) References Cited

U.S. PATENT DOCUMENTS

| | | |
|---|---|---|
| 3,910,651 A | 10/1975 | Pearce et al. |
| 5,003,773 A | 4/1991 | Beckwith |
| 5,224,822 A | 7/1993 | Lenahan et al. |
| 5,271,711 A * | 12/1993 | McGreehan ............ F01D 5/085 415/115 |
| 5,472,313 A * | 12/1995 | Quinones ................ F01D 5/082 415/115 |
| 5,862,666 A | 1/1999 | Liu |
| 6,923,005 B2 | 8/2005 | Casoni |
| 7,093,418 B2 | 8/2006 | Morris et al. |
| 7,703,290 B2 | 4/2010 | Bladon et al. |
| 7,775,764 B2 * | 8/2010 | Snowsill ................ F01D 5/082 415/115 |
| 8,147,185 B2 | 4/2012 | Ren |
| 8,251,643 B2 | 8/2012 | Zheng et al. |
| 2009/0051120 A1 | 2/2009 | Munsell et al. |
| 2010/0183439 A1 | 7/2010 | Ren |
| 2011/0217158 A1 | 9/2011 | Grissino et al. |
| 2015/0056068 A1 | 2/2015 | Wiebe |

* cited by examiner

SYSTEM AND METHOD FOR DOMESTIC BLEED CIRCUIT SEALS WITHIN A TURBINE

BACKGROUND

The field of the disclosure relates generally to gas turbine engines and, more particularly, to domestic bleed circuit seals within a low pressure turbine.

Gas turbine engines include a rotor assembly which is rotatable relative to stationary engine structures, including a rotor mounting structure. The rotor assembly includes a number of rotatable components, such as a central shaft, shaft cones, compressor rotor blades, turbine rotor blades, and dynamic air seals. Each component is reacted upon by static and/or dynamic axial pressure forces. The vector sum of these forces is a net axial force or thrust in either the forward or aft direction. The net thrust places axial loads on the stationary mounting structure, and typically a thrust bearing is employed to absorb the load. At least some known gas turbine engines generate such a large amount of thrust that a thrust balance system is used to balance the net axial load on the thrust bearing.

Furthermore, gas turbine engines typically extract a portion of compressed air from a compressor as bleed air into a domestic bleed circuit that facilitates, among other functions, component cooling, heating, sealing, purging, and thrust control. A portion of bleed air is channeled into turbine cavities for purge. The bleed air is used for preventing combustion gases from being ingested into the cavity and for cooling the turbine rotors. A portion of bleed air is also channeled into the thrust balance system for balancing the net axial load on the thrust bearing. Generally, compressor efficiency is reduced when compressed air is bled from the compressor. When compressor efficiency is reduced, output power of the gas turbine engine is reduced and/or engine fuel consumption is increased, with decreasing overall engine efficiency.

BRIEF DESCRIPTION

In one aspect, a turbine assembly is provided. The turbine assembly includes a rotor assembly including a shaft coupled to a plurality of rotor stages including a plurality of turbine blades. The shaft and the plurality of turbine blades define a wheelspace therein. The turbine assembly further includes a plurality of seals in series, at least one seal of the plurality of seals is coupled between a static support member and a respective rotor stage of the plurality of rotor stages such that a plurality of turbine cavities in series are defined within the wheelspace. Each turbine cavity of the plurality of turbine cavities defined by the plurality of seals receives a pressurized fluid flow that applies an axially aft force to the respective rotor stage of the plurality of rotor stages that at least partially reduces net rotor thrust generated by the rotor assembly during operation, the pressurized fluid flow further provides turbine purge within the wheel space.

In another aspect, a turbofan engine is provided. The turbofan engine includes an engine including a multistage compressor and a turbine. The turbine assembly includes a rotor assembly including a shaft coupled to a plurality of rotor stages including a plurality of turbine blades. The shaft and the plurality of turbine blades define a wheelspace therein. A fan is powered by the turbine driven by gas generated in the engine. The turbofan engine further includes a bleed system including a plurality of seals in series, at least one seal of the plurality of seals is coupled between a static support member and a respective rotor stage of the plurality of rotor stages such that a plurality of turbine cavities in series are defined within the wheelspace. Each turbine cavity of the plurality of turbine cavities defined by the plurality of seals receives a pressurized fluid flow that applies an axially aft force to the respective rotor stage of the plurality of rotor stages that at least partially reduces net rotor thrust generated by the rotor assembly during operation, the pressurized fluid flow further provides turbine purge within the wheel space.

In yet another aspect, a method of assembling a turbine assembly is provided. The method includes coupling a shaft to a plurality of rotor stages including a plurality of turbine blades forming a rotor assembly, wherein the shaft and the plurality of turbine blades define a wheelspace therein. The method further includes coupling a plurality of seals in series to the rotor assembly, at least one seal of the plurality of seals extends between a static support member and a respective rotor stage of the plurality of rotor stages such that a plurality of turbine cavities in series are formed within the wheelspace. Each turbine cavity of the plurality of turbine cavities defined by the plurality of seals receives a pressurized fluid flow that applies an axially aft force to the respective rotor stage of the plurality of rotor stages that at least partially reduces net rotor thrust generated by the rotor assembly during operation, the pressurized fluid flow further provides turbine purge within the wheelspace.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of a turbine domestic bleed circuit as described herein provides a system that can purge a turbine wheelspace and also reduce turbine rotor thrust, thereby facilitating improved engine performance. Specifically, the bleed circuit systems and methods described herein provide a plurality of seals in series that define a plurality of turbine cavities in series within the turbine wheelspace. Each turbine cavity receives pressurized bleed air for rotor purge. By channeling bleed air through a series of cavities and seals, the pressure differential across each seal is small and leakage is reduced, permitting a lower bleed air flow to be drawn from a compressor assembly. Additionally, the pressurized bleed air within each turbine cavity reduces an aft force on the respective turbine rotors such that the overall net thrust within the turbine assembly is reduced. Balancing the overall net thrust of the turbine can reduce or even eliminate use of a balance piston within the engine also permitting a lower bleed air flow to be drawn from the compressor assembly. By reducing the bleed air requirement of the domestic bleed circuit, compressor efficiency is increased such that engine output power is increased and/or fuel consumption is reduced.

Figure 1:
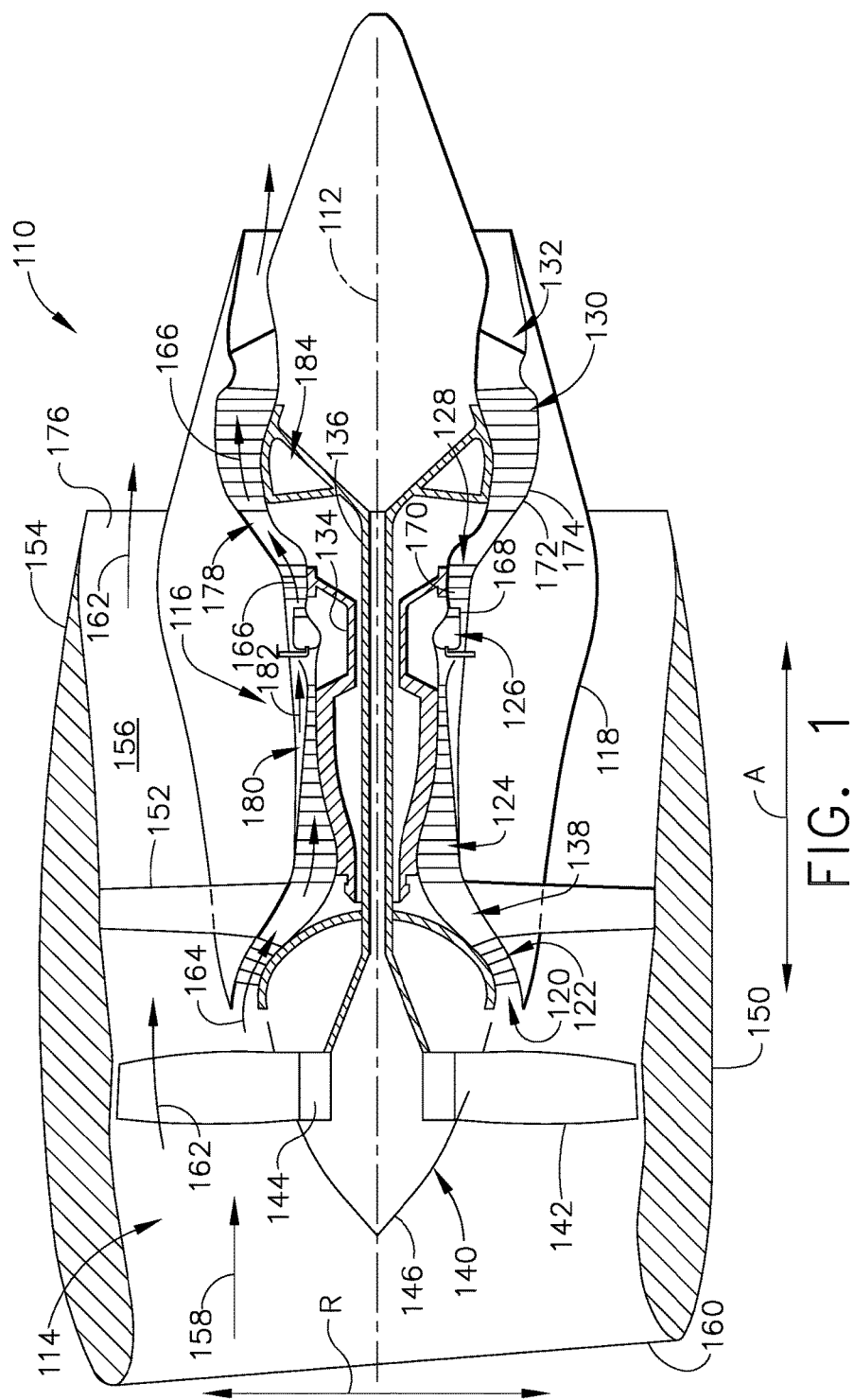
FIG. 1 is a schematic cross-sectional illustration of an exemplary gas turbine engine in accordance with an example embodiment of the present disclosure.

FIG. 1 is a schematic cross-sectional view of a gas turbine engine in accordance with an exemplary embodiment of the present disclosure. In the exemplary embodiment, the gas turbine engine is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R (extending perpendicular to longitudinal centerline 112). In general, turbofan engine 110 includes a fan assembly 114 and a gas turbine engine 116 disposed downstream from fan assembly 114.

Gas turbine engine 116 includes a substantially tubular outer casing 118 that defines an annular inlet 120. Outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122 and a fan 140. The compressor section, combustion section 126, turbine section, and exhaust nozzle section 132 together define an air flow path 138.

In the exemplary embodiment, fan assembly 114 includes fan 140 having a plurality of fan blades 142 coupled to a disk 144 in a spaced apart manner. As depicted, fan blades 142 extend outwardly from disk 144 generally along radial direction R. Fan blades 142 and disk 144 are together rotatable about longitudinal centerline 112 by LP shaft 136.

Referring still to the exemplary embodiment of FIG. 1, disk 144 is covered by rotatable front hub 146 aerodynamically contoured to promote an airflow through plurality of fan blades 142. Additionally, exemplary fan assembly 114 includes an annular fan casing or outer nacelle 150 that circumferentially surrounds fan 140 and/or at least a portion of gas turbine engine 116. It should be appreciated that nacelle 150 may be configured to be supported relative to gas turbine engine 116 by an outlet guide vane assembly 152. Moreover, a downstream section 154 of nacelle 150 may extend over an outer portion of gas turbine engine 116 so as to define a bypass airflow passage 156 therebetween.

During operation of turbofan engine 110, a volume of air 158 enters turbofan 110 through an associated inlet 160 of nacelle 150 and/or fan assembly 114. As air 158 passes across fan blades 142, a first portion of air 158 as indicated by arrows 162 is directed or routed into bypass airflow passage 156 and a second portion of air 158 as indicated by arrows 164 is directed or routed into air flow path 138, or more specifically into booster compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, thus causing LP shaft or spool 136 to rotate, thereby supporting operation of booster compressor 122 and/or rotation of fan 140. Combustion gases 166 are subsequently routed through jet exhaust nozzle section 132 of gas turbine engine 116 to provide propulsive thrust. Simultaneously, the pressure of first portion of air 162 is substantially increased as first portion of air 162 is routed through bypass airflow passage 156, including through outlet guide vane assembly 152 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through gas turbine engine 116.

Furthermore, gas turbine engine 116 includes a domestic bleed circuit 180 that extracts a portion of compressed air 164 from HP compressor 124 as bleed air flow 182 for a variety of engine functions including component cooling, heating, sealing, purging, and thrust control. Bleed circuit 180 includes a portion 200 (shown in FIG. 2) that extends into a LP turbine wheelspace 184 that is formed by LP static support structure and rotor, such as 222 and 228 respectively (shown in FIG. 2). Specifically, LP turbine wheelspace 184 is the area between LP turbine inner hot gas flow path 178 and shaft 136. Bleed circuit 180 receives bleed air flow 182 for LP turbine 130 purge and thrust control as discussed further below in reference to FIG. 2.

Figure 2:
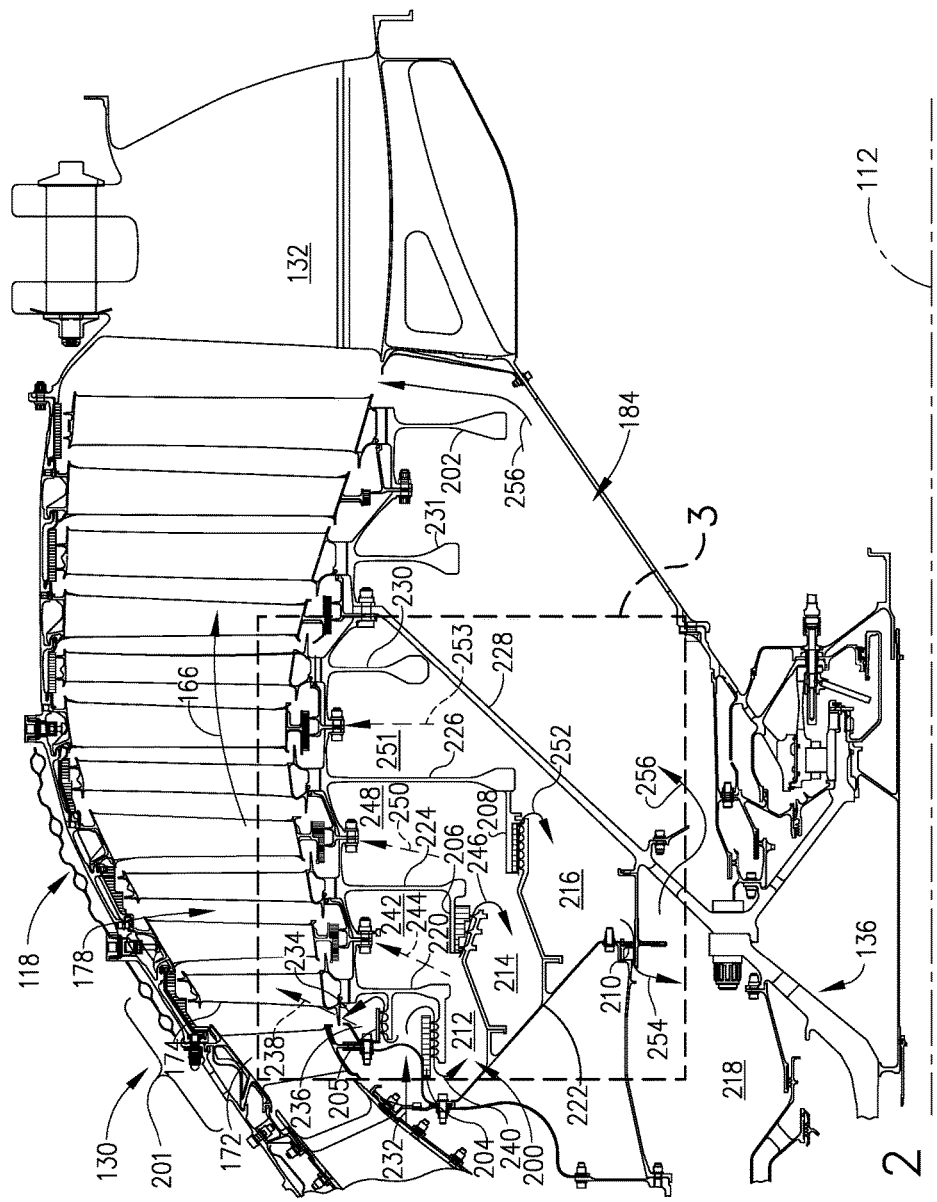
FIG. 2 is a schematic cross-sectional view of an exemplary bleed circuit within a LP turbine wheelspace of the turbofan engine shown in FIG. 1.

In operation, hot pressurized combustion gases 166 that are channeled through LP turbine rotor blades and stator vanes 174 and 172 have a tendency to fill LP turbine wheelspace 184 resulting in overheating LP turbine disks 202, such as in rotor blade stages 220, 224, 226, 230, and 231 (all shown and described in FIG. 2). Bleed air flow 182 is supplied through bleed circuit 180 to LP turbine wheelspace 184 preventing combustion gases 166 from being ingested into turbine wheelspace 184 and also for cooling LP turbine disks 202, such as in rotor blade stages 220, 224, 226, 230, and 231 (shown in FIG. 2).

Furthermore, in operation, LP turbine 130 generates an axial load or thrust in the aft direction. This thrust places axial loads on the stationary mounting structure which are absorbed through a thrust bearing (not shown). In the exemplary embodiment, the overall thrust from LP turbine 130 is reduced by reducing aft axial loads on LP turbine rotors 220, 224, 226, 230, and 231 (shown in FIG. 2). Balancing the axial thrust of LP turbine 130 facilitates reducing the net thrust from LP turbine 130 realized by the thrust bearing.

It should be appreciated, however, that exemplary turbofan engine 110 depicted in FIG. 1 is by way of example only, and that in other exemplary embodiments, turbofan engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a military purpose engine, and a marine or land-based aero-derivative engine.

Figure 3:
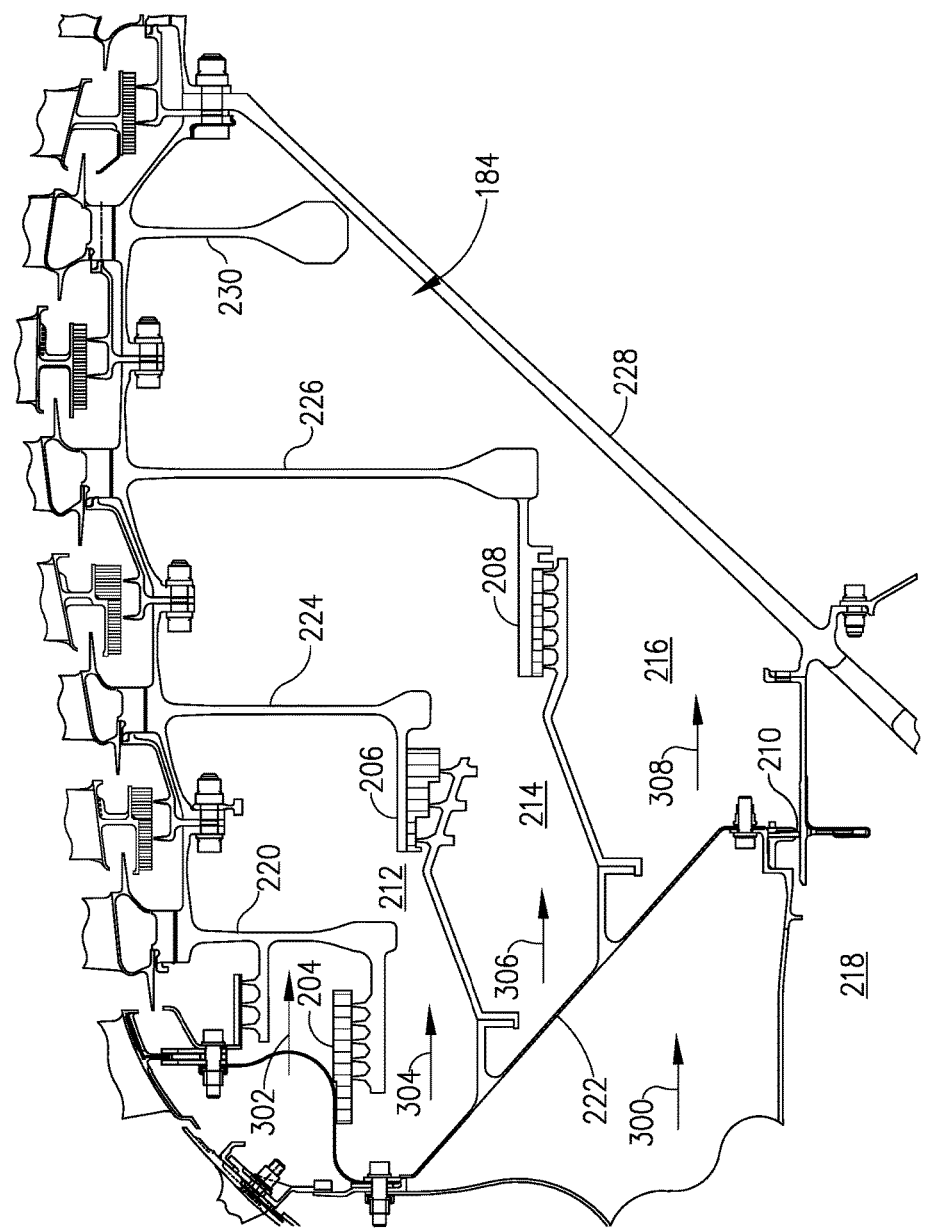
FIG. 3 is an enlarged view of a portion of FIG. 2 taken along area 3.

FIG. 2 is a schematic cross-sectional view of bleed circuit 200 within LP turbine wheelspace 184 of turbofan engine 110 (shown in FIG. 1). FIG. 3 is an enlarged view of FIG. 2 taken along area 3. Referring to FIGS. 2 and 3, LP turbine 130 includes a plurality of stator vanes 172 coupled to outer casing 118 and a plurality of rotor blades 174 that are coupled to shaft 136 through rotor 228 that defines hot gas path 178. A stage 201 of LP turbine 130 includes one stator vane 172 and one rotor blade 174. Bleed circuit 200 is extends within LP turbine wheelspace 184 and includes a plurality of seals, for example first seal 204, second seal 206, third seal 208, and fourth seal 210, radially arranged in series within wheelspace 184. Each seal forms a turbine cavity, for example first turbine cavity 212, second turbine cavity 214, third turbine cavity 216, and fourth turbine cavity 218, that are also in series within bleed circuit 200, such that bleed circuit 200 within LP turbine wheelspace 184 includes a series of cavities bounded by a series of seals.

For example, first seal 204 is positioned between a first rotor blade stage 220 and a static support structure 222. In the exemplary embodiment, another seal 205 is also coupled to first rotor blade stage 220. In alternative embodiment, first seal 204 has any other configuration that enables bleed circuit 200 to function as described herein, for example a seal with a radially outer seal and a radially inner seal. Second seal 206 is positioned downstream of first seal 204 and between static support structure 222 and a second rotor blade stage 224. Third seal 208 is positioned downstream from second seal 206 and between static support structure 222 and a third rotor blade stage 226. Fourth seal 210 is downstream of third seal 208 and positioned between static support structure 222 and rotor 228, wherein rotor 228 is positioned between a fourth rotor blade stage 230 and a fifth rotor blade stage 231.

First turbine cavity 212 is defined between first seal 204 and second seal 206 such that first turbine cavity 212 is between first rotor blade stage 220 and second rotor blade stage 224. Second turbine cavity 214 is defined between second seal 206 and third seal 208 such that second turbine cavity 214 is between second rotor blade stage 224 and third rotor blade stage 226. In some embodiments, third turbine cavity 216 is defined between third seal 208 and fourth seal 210 downstream of third rotor blade stage 226 and second turbine cavity 214. Downstream of third turbine cavity 216 is a fourth turbine cavity 218 bounded by fourth seal 210 that is an exit cavity which is open to exhaust nozzle section 132.

In the exemplary embodiment, each seal 204, 205, 206, 208, and 210 is illustrated as a labyrinth seal, and more specifically, a stepped labyrinth seal that facilitates reducing fluid leakage. In some embodiments, the number of seal teeth is increased to further reduce fluid leakage and/or the seal radius is decreased to reduce fluid leakage therethrough. In alternative embodiments, seals 204, 205, 206, 208, and 210 may be any other seal type that enables bleed circuit 200 to operate as described herein. For example, seals 204, 205, 206, 208, and 210 may be a non-contact seal, such as an aspirating seal.

In operation, pressurized bleed air 182 is extracted from HP compressor 124 and channeled through domestic bleed circuit 180 towards LP turbine (as shown in FIG. 1). A portion 232 of bleed air 182 is channeled to bleed circuit 200 for purging LP turbine 130. Specifically, bleed air 232 is channeled 234 into a wheelspace 236 for rotor purge 238 through seal 205 that prevents combustion gases 166 from being ingested into turbine wheelspace 236 and also for cooling first rotor blade stage 220. The initial pressure requirement of bleed air 232 is set by a leading edge of first rotor blade stage 220. Bleed air 232 is further channeled 240 through first seal 204 into first turbine cavity 212 and a turbine wheelspace 242 for purging 244 LP turbine 130. Within first turbine cavity 212, bleed air 232 has a second pressure requirement that is set by second rotor blade stage 224 which is generally lower than the pressure requirement of first rotor blade stage 220. From first turbine cavity 212, bleed air 232 is channeled 246 through second seal 206 into second turbine cavity 214 and a turbine wheelspace 248 for purging 250 LP turbine 130. Bleed air 232 within second turbine cavity 214 has a third pressure requirement that is set by third rotor blade stage 226 which is generally lower than the pressure requirement of first and second rotor blade stages 220 and 224.

From second turbine cavity 214, bleed air 232 is channeled 252 through third seal 208 into third turbine cavity 216 and a turbine wheelspace 251 for purging 253 LP turbine 130. Bleed air 232 within third turbine cavity has a fourth pressure requirement that is set by fourth rotor blade stage 230 which is generally lower than the pressure requirement within the preceding turbine cavities 212 and 214. Bleed air continues to be channeled 254 from third turbine cavity 216 through fourth seal 210 and into exit and fourth turbine cavity 218. Fourth turbine cavity 218 is open to exhaust section 132 such that bleed air 232 is exhausted 256 to the ambient air. The pressure requirement of bleed air 232 within fourth turbine cavity 218 is set by exhaust section 132 and is generally lower than the pressure within the preceding turbine cavities 212, 214, and 216.

For example, bleed air 232 pressure within first turbine cavity 212 is at a first pressure, for example 60 pounds per square inch (psi). Bleed air 232 pressure within second turbine cavity 214 is at a second pressure, for example 44 psi, while bleed air 232 pressure within third turbine cavity 216 is at a third pressure, for example 30 psi, and bleed air 232 pressure within fourth turbine cavity 218 is at a fourth pressure, for example 17 psi. By dropping bleed air 232 pressure through plurality of turbine cavities 212, 214, 216, and 218 and through plurality of seals 204, 206, 208, and 210, the pressure differential across any one seal is reduced thereby reducing leakage within bleed circuit 200. Generally, a lower pressure differential across the seal permits a lower amount of fluid leakage through the seal. When fluid leakage within bleed circuit 200 is reduced, efficiency of bleed circuit 200 is increased thus requiring less bleed air 182 to be drawn from HP compressor 124. Less bleed air 182 drawn from HP compressor increases compressor efficiency resulting in reduced fuel consumption. Conversely, if a single seal, for example seal 210, is used for LP turbine 130 purge, the seal would have a large pressure differential, such as between first rotor blade stage 220 and fourth turbine cavity 218, increasing fluid leakage therethrough.

In the exemplary embodiment, bleed circuit 200 includes a series of four seals 204, 206, 208, and 210 which forms a series of four turbine cavities 212, 214, 216, and 218 within LP turbine wheelspace 184. In alternative embodiments, bleed circuit 200 has any number of seals that enable the system to operate as described herein. For example, bleed circuit 200 may include only seals 204, 206, and 210 forming only turbine cavities 212, 214, and 218 within LP turbine wheelspace.

Furthermore, in addition to bleed circuit 200 facilitating LP turbine 130 effective purging, bleed circuit 200 also facilitates reducing overall net thrust from LP turbine 130 on LP rotor assembly 136. In operation, and as illustrated in FIG. 3, each rotor stage generates a net axial thrust 300 in the aft direction on LP rotor assembly 136. Specifically, the pressure requirement of bleed air 232 upstream of first rotor blade stage 220 results in an aft force 302, the pressure requirement of first turbine cavity 212 results in an aft force 304, the pressure requirement of second turbine cavity 214 results in an aft force 306, and the pressure requirement of third turbine cavity 216 results in an aft force 308. By including a plurality of seals 204, 206, 208, and 210 within LP turbine wheelspace 184 and forming a series of four turbine cavities 212, 214, 216, and 218, net aft thrust 300 is facilitated to be reduced when compared to a single cavity wheelspace that includes a pressure requirement set by only the leading edge of first rotor blade stage 220. The single cavity wheelspace has a higher pressure requirement resulting in a larger aft force and net axial thrust because the higher pressure requirement is throughout wheelspace 184. Conversely, in the exemplary embodiment, the pressure requirement within wheelspace 184 is reduced through a series of cavities, such as turbine cavities 212, 214, 216, and 218 that reduces net aft thrust 300. Reducing net aft thrust 300 of LP turbine 130 facilitates reducing the force realized by the thrust bearing (not shown) thus reducing bearing sizes and weight, as well as, the overcall weight and cost of turbofan engine 110. Furthermore, reducing net aft thrust 300 of LP turbine 130 facilitates a balance piston (not shown) along with bleed air to operate the balance piston to be sized smaller or even eliminated within turbofan engine 110.

In the exemplary embodiment, by reducing LP turbine 130 thrust within domestic bleed circuit 200, the balance piston can be eliminated which further reduces the amount of bleed air 182 drawn from HP compressor 124. Less bleed air 182 drawn from HP compressor 124 increases compressor efficiency resulting in increased engine 110 power or reduced fuel consumption.

The above-described embodiments of the turbine domestic bleed circuit facilitate a system that can effectively purge a turbine wheelspace and also reduce turbine rotor thrust, thereby improving engine performance. Specifically, the bleed circuit systems and methods described herein provide a plurality of seals in series that define a plurality of turbine cavities in series within the turbine wheelspace. Each turbine cavity receives pressurized bleed air for rotor purge. By channeling bleed air through a series of cavities and seals, the pressure differential across each seal is small and leakage is reduced, permitting a lower bleed air flow to be drawn from a compressor assembly. Additionally, the pressurized bleed air within each turbine cavity reduces an aft force on the respective turbine rotors such that the overall net thrust within the turbine assembly is reduced. Balancing the overall net thrust of the turbine can reduce or even eliminate use of a balance piston within the engine also permitting a lower bleed air flow to be drawn from the compressor assembly. By reducing the bleed air requirement of the domestic bleed circuit, compressor efficiency is increased such that engine output power is increased and/or fuel consumption is reduced.

An exemplary technical effect of the methods, systems, and apparatus described herein includes at least one of: (a) increasing effective rotor purge; (b) reducing bleed air leakage through seals; (c) decreasing rotor thrust loads; (d) reducing bleed air drawn from a compressor assembly; (e) reducing and/or eliminating a balance piston; (f) reducing bearing sizes and weight of supporting structures; (g) increasing compressor efficiency; (h) increasing engine output power; and (i) reducing engine fuel consumption; and (j) reducing weight and cost of the turbofan engine.

Exemplary embodiments of methods, systems, and apparatus for the turbine bleed circuit systems are not limited to the specific embodiments described herein, but rather, components of the systems and/or steps of the methods may be utilized independently and separately from other components and/or steps described herein. For example, the methods may also be used in combination with other systems requiring reducing pressure loss and balancing rotor thrust, and the associated methods, and are not limited to practice with only the systems and methods as described herein. Rather, the exemplary embodiment can be implemented and utilized in connection with many other applications, equipment, and systems that may benefit from reducing pressure loss and balancing rotor thrust.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbine assembly comprising:
    a rotor assembly comprising a shaft coupled to a plurality of rotor stages comprising a plurality of turbine blades, wherein said shaft and said plurality of turbine blades define a wheelspace therein; and
    a plurality of seals in series, at least one seal of said plurality of seals coupled between a static support member and a respective rotor stage of said plurality of rotor stages such that a plurality of turbine cavities in series are defined within said wheelspace, wherein each turbine cavity of said plurality of turbine cavities defined by said plurality of seals receives a pressurized fluid flow that applies an axially aft force to said respective rotor stage of said plurality of rotor stages that at least partially reduces net rotor thrust generated by said rotor assembly during operation, said pressurized fluid flow further provides turbine purge within said wheelspace, wherein at least one turbine cavity of said plurality of turbine cavities is defined between a first seal of said plurality of seals and a second seal of said plurality of seals such that the turbine cavity is between a first rotor stage and a second rotor stage of the plurality of rotor stages of the rotor assembly.

2. The turbine assembly in accordance with claim 1, wherein each turbine cavity of said plurality of turbine cavities is defined between adjacent seals of said plurality of seals such that the turbine cavity is between adjacent rotor stages of said plurality of rotor stages.

3. The turbine assembly in accordance with claim 1, wherein at least one seal of said plurality of seals extends between said static support member and a rotor.

4. The turbine assembly in accordance with claim 1, wherein each turbine cavity of said plurality of turbine cavities is configured to be pressurized, wherein a pressure requirement of a first turbine cavity of said plurality of turbine cavities is substantially not equal to a pressure requirement of a second turbine cavity of said plurality of turbine cavities.

5. The turbine assembly in accordance with claim 1, wherein each seal of said plurality of seals comprises a labyrinth seal.

6. The turbine assembly in accordance with claim 1, wherein each seal of said plurality of seals comprises a non-contact seal.

7. A turbofan engine comprising:
an engine comprising a multistage compressor and a turbine, said turbine comprising a rotor assembly comprising a shaft coupled to a plurality of rotor stages comprising a plurality of turbine blades, wherein said shaft and said plurality of turbine blades define a wheelspace therein;
a fan powered by said turbine driven by gas generated in said engine; and
a bleed system comprising a plurality of seals in series, at least one seal of said plurality of seals coupled between a static support member and a respective rotor stage of said plurality of rotor stages such that a plurality of turbine cavities in series are defined within said wheelspace, wherein each turbine cavity of said plurality of turbine cavities defined by said plurality of seals to receives a pressurized fluid flow that applies an axially aft force to said respective rotor stage of said plurality of rotor stages that at least partially reduces net rotor thrust generated by said rotor assembly during operation, said pressurized fluid flow further provides turbine purge within said wheelspace, wherein at least one turbine cavity of said plurality of turbine cavities is defined between a first seal of said plurality of seals and a second seal of said plurality of seals such that the turbine cavity is between a first rotor stage and a second rotor stage of the plurality of rotor stages of the rotor assembly.

8. The turbofan engine in accordance with claim 7, wherein each turbine cavity of said plurality of turbine cavities is defined between adjacent seals of said plurality of seals such that the turbine cavity is between adjacent rotor stages of said plurality of rotor stages.

9. The turbofan engine in accordance with claim 7, wherein at least one seal of said plurality of seals extends between said static support member and a rotor.

10. The turbofan engine in accordance with claim 7, wherein each turbine cavity of said plurality of turbine cavities is configured to be pressurized, wherein a pressure requirement of a first turbine cavity of said plurality of turbine cavities is substantially not equal to a pressure requirement of a second turbine cavity of said plurality of turbine cavities.

11. The turbofan engine in accordance with claim 7, wherein each seal of said plurality of seals comprises a labyrinth seal.

12. The turbofan engine in accordance with claim 7, wherein each seal of said plurality of seals comprises a non-contact seal.

13. A method of assembling a turbine assembly comprising:
coupling a shaft to a plurality of rotor stages including a plurality of turbine blades forming a rotor assembly, wherein the shaft and the plurality of turbine blades define a wheelspace therein;
coupling a plurality of seals in series to the rotor assembly, at least one seal of the plurality of seals extends between a static support member and a respective rotor stage of the plurality of rotor stages such that a plurality of turbine cavities in series are formed within the wheelspace, wherein each turbine cavity of the plurality of turbine cavities defined by the plurality of seals receives a pressurized fluid flow that applies an axially aft force to the respective rotor stage of the plurality of rotor stages that at least partially reduces net rotor thrust generated by the rotor assembly during operation, the pressurized fluid flow further provides turbine purge within the wheelspace; and
forming at least one turbine cavity of the plurality of turbine cavities between a first seal of said plurality of seals and a second seal of said plurality of seals such that the turbine cavity is between a first rotor stage and a second rotor stage of the plurality of rotor stages of the rotor assembly.

14. The method of claim 13 further comprising forming each turbine cavity of the plurality of turbine cavities between adjacent seals of said plurality of seals such that the turbine cavity is between adjacent rotor stages of the plurality of rotor stages.

15. The method of claim 13, wherein coupling the plurality of seals in series further comprises extending at least one seal of said plurality of seals between two static support members.

16. The method of claim 13, wherein coupling a plurality of seals in series further comprises coupling a labyrinth seal.

17. The method of claim 13, wherein coupling a plurality of seals in series further comprises coupling a non-contact seal.

* * * * *